United States Patent [19]
Collins et al.

[11] 3,821,891

[45] July 2, 1974

[54] ULTRASONIC NONDESTRUCTIVE MATERIAL TESTER

[75] Inventors: Jack T. Collins, Boulder, Colo.; Howard E. Van Valkenburg, New Fairfield, Conn.

[73] Assignee: Automation Industries Inc., El Segundo, Calif.

[22] Filed: Dec. 10, 1970

[21] Appl. No.: 97,035

Related U.S. Application Data

[63] Continuation of Ser. No. 687,752, Dec. 4, 1967, abandoned.

[52] U.S. Cl. ...................... 73/67.9, 128/2 V, 351/6
[51] Int. Cl. ............................................. G01n 29/04
[58] Field of Search ......................... 73/67.7–67.9; 128/2, 24.05; 351/6; 340/3, 3 C; 343/13

[56] References Cited
UNITED STATES PATENTS

| | | | |
|---|---|---|---|
| 2,458,771 | 1/1949 | Firestone | 73/67.8 X |
| 2,682,766 | 7/1954 | Van Valkenburg | 73/67.9 |
| 2,871,404 | 1/1959 | Mugele | 73/67.7 X |
| 3,114,258 | 12/1963 | Stebbins et al. | 73/67.9 |
| 3,371,660 | 3/1968 | Carlin | 73/67.8 X |

OTHER PUBLICATIONS

Mundt, et al., Ultrasonics in Ocular Diagnosis, American Journal of Opthalmology, March 1956, p 488–493, 73–67.8.

Robinson, et al., The C.A.L. Two–channel Echo–encephaloscope, Ultrasonics, April–June, 1965, p 69–74, 73–67.9

*Primary Examiner*—Richard C. Quiesser
*Assistant Examiner*—John P. Beauchamp
*Attorney, Agent, or Firm*—Dan R. Sadler

[57] ABSTRACT

An ultrasonic nondestructive material tester is disclosed which is especially useful in making interface measurements of an eyeball. An ultrasonic transducer receives ultrasonic energy returned from within the eyeball. An oscilloscope which includes a plurality of display channels operates synchronously with corresponding gates which display selected portions of an eyeball on the display of the oscilloscope.

9 Claims, 5 Drawing Figures

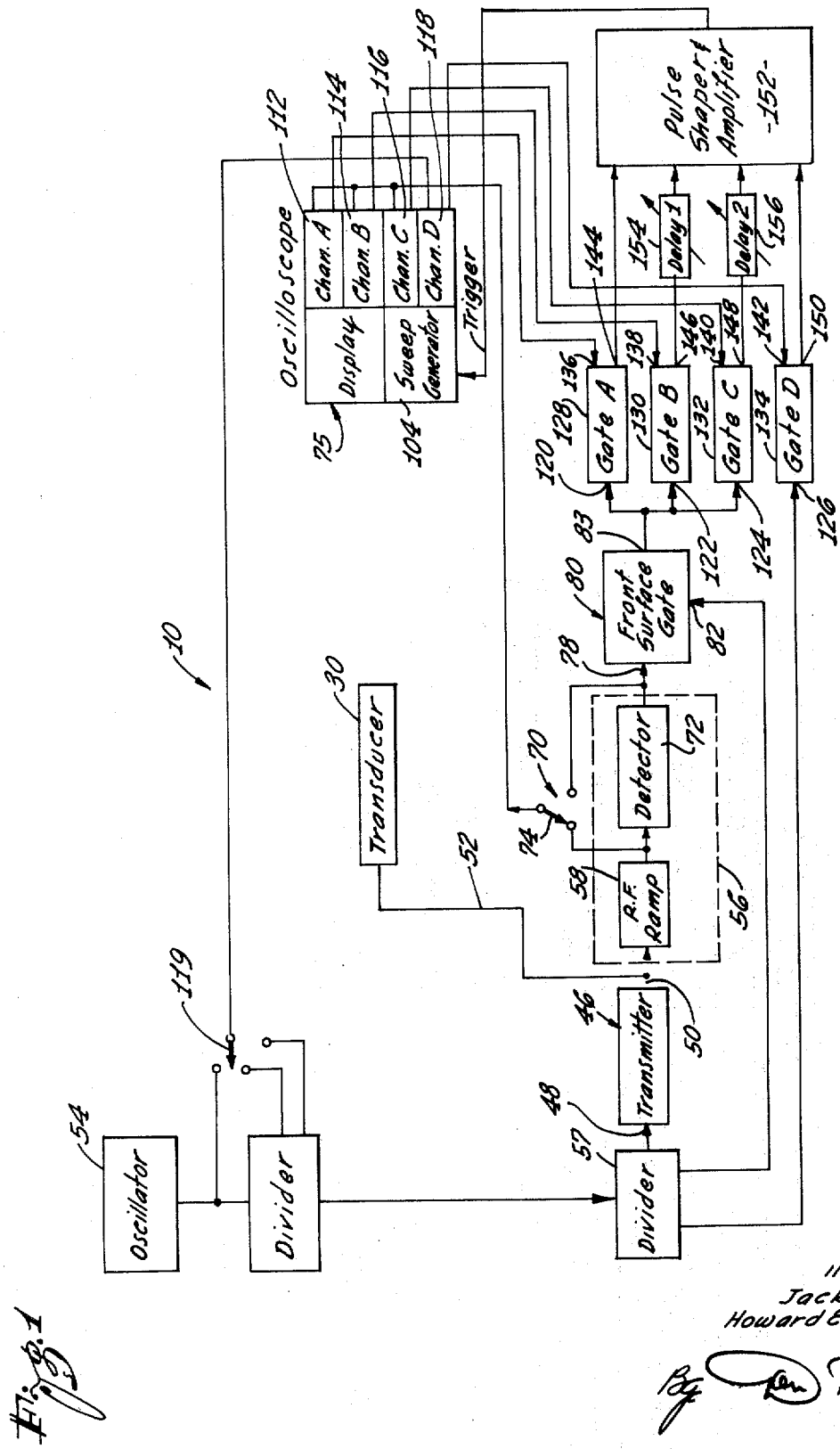

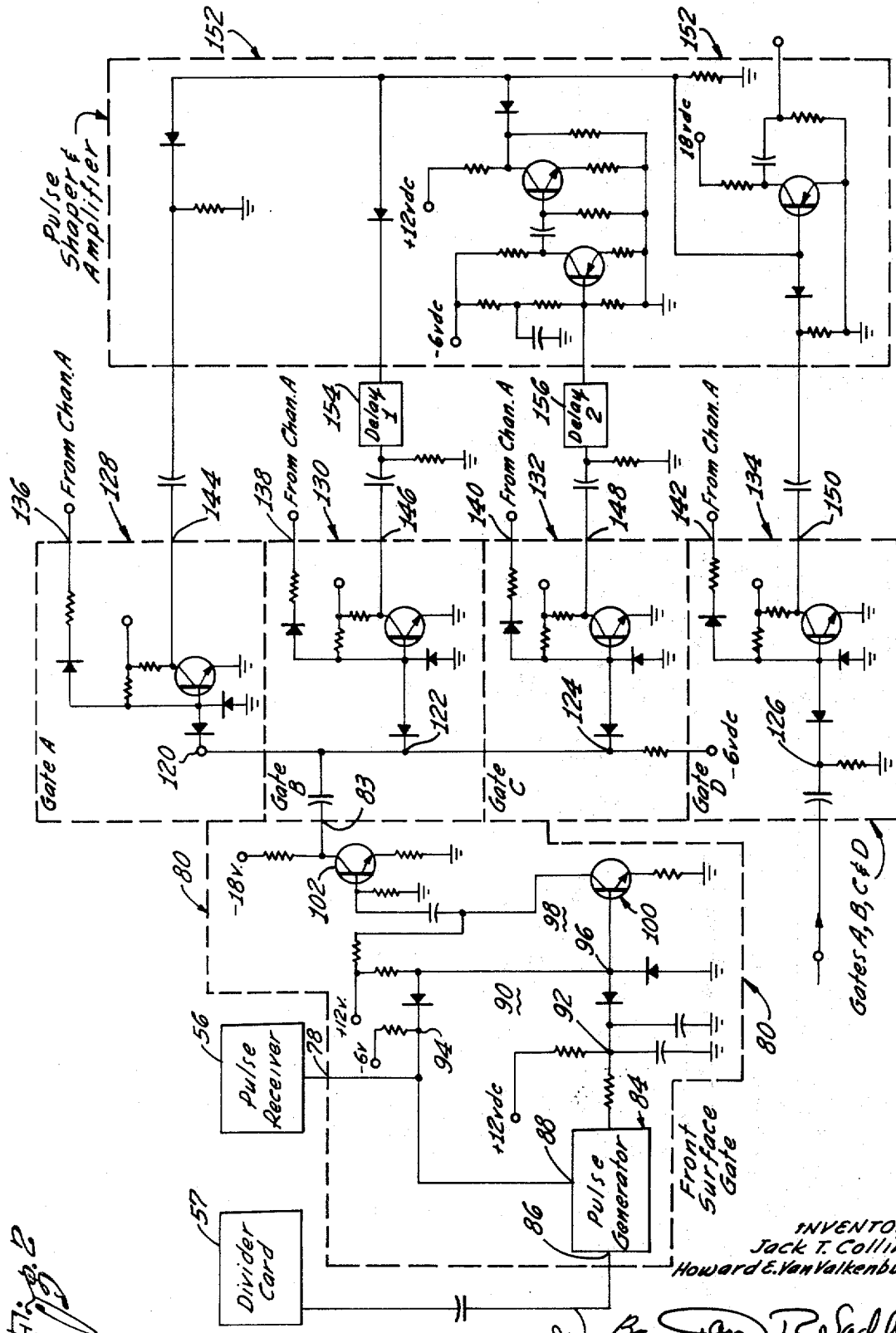

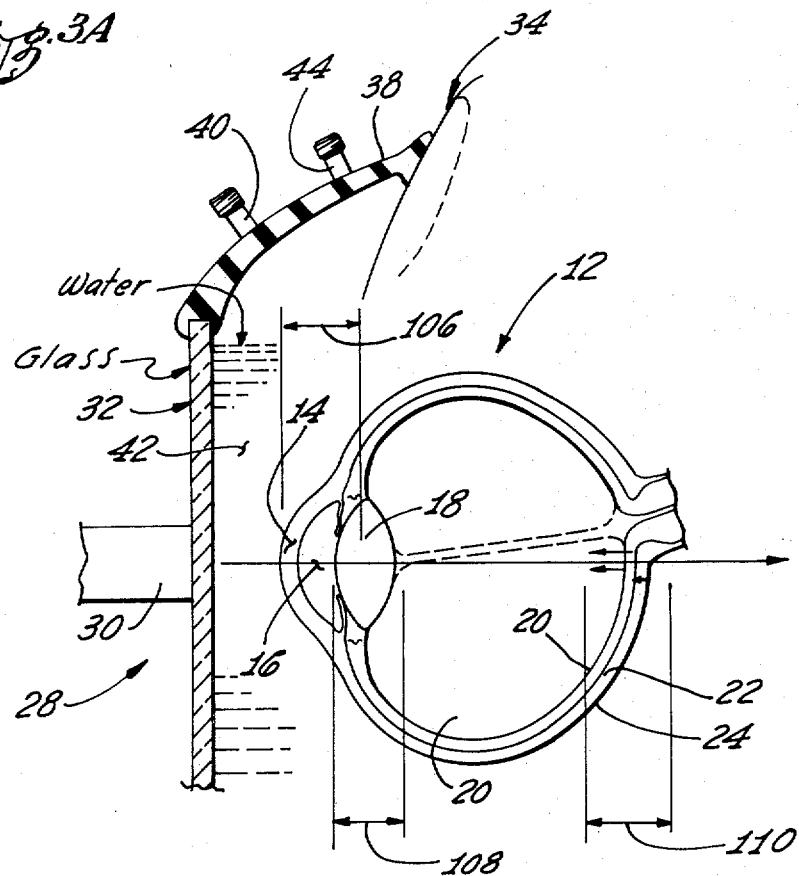
Fig. 3A
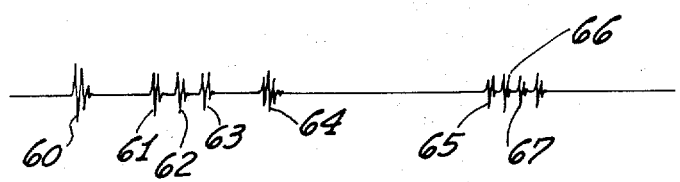
Fig. 3B
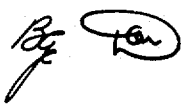

ULTRASONIC NONDESTRUCTIVE MATERIAL TESTER

CROSS REFERENCE TO RELATED APPLICATIONS

This is a continuation of co-pending application Ser. No. 687,752 filed Dec. 4, 1967 in the name of Jack T. Collins and Howard E. Van Valkenburg for *Ultrasonic Nondestructive Material Tester*, and assigned of record to Automation Industries, Inc. now abandoned.

The present invention relates to an ultrasonic nondestructive testing instrument for measuring the internal dimension of a workpiece. More particularly this instrument is especially adapted for measuring with a high degree of precision the internal dimensions of the human eyeball and the dimensions of the different parts thereof.

In the particular embodiment disclosed herein a cathode ray oscilloscope produces an "A-scan" display having a plurality of indications positioned to represent the positions of the different interfaces within the eyeball. In order to increase the accuracy of the display it is divided into a plurality of different portions spaced in a vertical array. The eyeball is arbitrarily divided into a plurality of different segments corresponding to the different portions of the display. Each segment of the eyeball may be separately studied and the dimensions thereof determined from its respective portion of the display.

One important aspect of the disclosure is related to the horizontal sweep for each portion of the display being synchronized with respect to a common reference point in the eyeball. As a result the distances between the interfaces represented on the different portions of the display can be accurately determined. The distances from all of the interfaces in the eyeball to a common reference point can be accurately measured.

INTRODUCTION

One commonly employed method of nondestructively inspecting the interior of a workpiece is to transmit ultrasonic energy into the workpiece and receive the returning echoes. These echoes are reflected from the interfaces formed at the discontinuities within the workpiece. Initially the use of this type of equipment was confined to the inspection of inanimate objects of rigid materials, such as steel, aluminum, plastics, etc.

Following the development of satisfactory equipment for inspecting inanimate objects, it was proposed to utilize ultrasonic testing techniques for inspecting living tissue, including various portions of the human body. Initially essentially conventional industrial equipment was employed for these purposes and a considerable amount of useful information was obtained.

However, because of the peculiarities of living tissue, it has been found conventional forms of industrial type ultrasonic equipment is not entirely suitable for medical purposes. As a result several different types of ultrasonic equipment were developed specifically for medical research and diagnostic forms of inspection.

One type of medical equipment especially adapted for ultrasonically inspecting living organs is disclosed in U.S. Pat. No. 3,023,611, entitled *Ultrasonic Method and Apparatus for Investigating the Internal Structure of Solid Bodies*, filed in the name of Douglass H. Howry and in U.S. Pat. No. 3,086,390, entitled *Examination by Ultrasonics of Bodies having a Non-planar Surface*, filed in the name of T. G. Brown. The systems disclosed in these two patents employ a form of so-called compound scanning whereby the interior of the human body is simultaneously scanned in two different modes. This permits the systems to obtain echoes from curved surfaces such as those of an organ whereby a two dimensional display representing a cross sectional view of the organ can be generated.

Another type of ultrasonic equipment especially adapted for medical purposes is disclosed and claimed in a co-pending application entitled *Ultrasonic Tester*, Ser. No. 440,205, filed Mar. 16, 1965, now abandoned, in the name of Donald W. Munger and an application entitled *Ultrasonic Tester*, Ser. No. 583,712 filed Oct. 3, 1966, now abandoned, in the names of Robert E. Callihan and Donald W. Munger, both of said applications being assigned of record to Automation Industries, Inc. Equipment of this type is particularly useful for examining the interior of the human brain and particularly the position of the midline. The equipment indicates directly the position of the midline relative to the centerline of the skull and whether it has been shifted laterally from the centerline because of a concussion, tumor, etc.

Another type of ultrasonic equipment adapted for medical purposes is disclosed and claimed in a co-pending application entitled *Ultrasonic Tester* Ser. No. 518,575, filed Jan. 4, 1966, now Pat. No. 3,713,329, in the name of Donald W. Munger and assigned of record to Automation Industries, Inc. This type of equipment is particularly adapted for observing the periodic or quasi-periodic motion of an organ or part thereof. For example, this equipment is effective to indicate the mode, rate and amount of movement of the mitral valve in the heart.

SUMMARY OF THE INVENTION

The present invention, as disclosed herein, is embodied in a novel type of ultrasonic instrument especially adapted for medical research and diagnostic purposes with respect to the human eyeball. This instrument includes means such as a transducer for transmitting pulses of ultrasonic energy into the eyeball and receiving echoes reflected from the interfaces separating the different parts of the eyeball. Such interfaces are formed at the boundaries of the cornea, anterior chamber, lens, vitreous body, retina, choroid, sclera, etc. The instrument includes display means such as a cathode ray oscilloscope for producing a visual display representing the positions of the reflecting interfaces. The distances between the different reflecting interfaces may be accurately measured by measuring the distances between the corresponding parts of the display.

In order to enhance the accuracy of the instrument, means are provided for dividing the display into a plurality of separate portions corresponding to different arbitrarily selected segments of the eyeball. These successive portions of the display are aligned in a vertical array one above the other. The scale of each portion is greatly expanded over the scale required to maintain the entire display in a single line whereby the dimensions within a particular segment may be very accurately measured. In addition means are provided for accurately correlating the different portions of the display whereby the distance from a particular point in one segment of the eyeball to a particular point in another segment of the eyeball may be accurately determined.

These and other features and advantages of the present invention will become readily apparent from the following detailed description of a single embodiment thereof, particularly when taken in connection with the accompanying drawings wherein like reference numerals refer to like parts.

SUMMARY OF THE DRAWINGS

FIG. 1 is a block diagram of an ultrasonic system embodying one form of the present invention and particularly adapted for inspecting a human eyeball and producing an accurate display of the dimensions of the various parts of the eyeball;

FIG. 2 is a combination schematic and block diagram of a portion of the ultrasonic system shown in FIG. 1;

FIG. 3A is a cross sectional view of an eyeball and a portion of a search unit employed in the system of FIG. 1;

FIG. 3B is a waveform of a signal produced by the transducer when inspecting the eyeball of FIG. 3A.

DETAILED DESCRIPTION OF THE DRAWINGS

Figure 4:
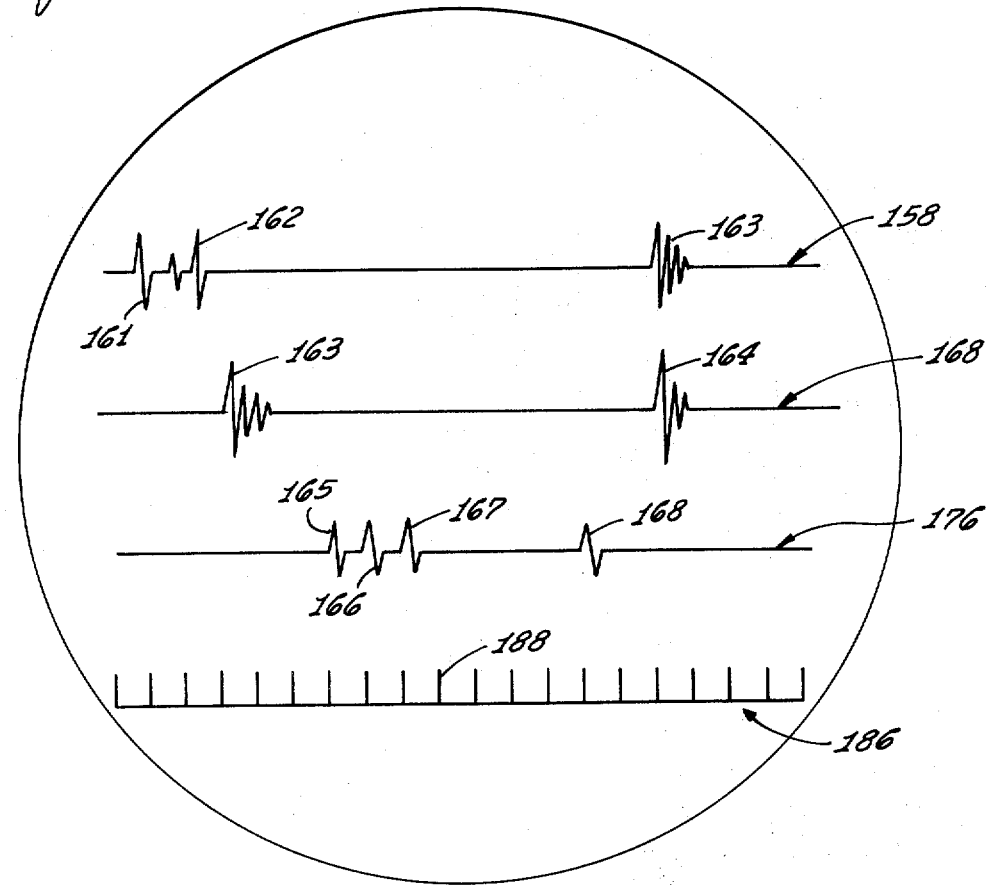
FIG. 4 is a showing of a typical display produced by the system when inspecting the eyeball of FIG. 2.

The present invention is embodied in an ultrasonic nondestructive testing instrument 10 for inspecting the internal structure of a workpiece as set forth in FIG. 1. Although this instrument 10 may be used for inspecting a wide variety of different types of workpieces, in the present instance it is especially useful for inspecting the human eyeball 12 shown in FIG. 3A and particularly for measuring the dimensions and relative positions of the various parts thereof.

A typical, healthy eyeball is illustrated in the cross sectional view in FIG. 3. The eyeball 12 is a relatively complex structure having a large number of different parts. The parts of the eyeball 12 which are of particular interest in the present instance are the cornea 14, the anterior chamber 16, the lens 18, the vitreous body 20, the retina 22, the choroid 24, and the sclera 24.

The structure of each of these parts is different from the adjacent parts and is separated therefrom by an interface, i.e., two adjacent surfaces. The acoustical properties, such as the impedances, etc. on the opposite sides of the interface are different. As a result when ultrasonic energy is incident upon an interface a portion of the energy is reflected from the interface. However, a major portion of the energy traverses the interface and travels on into the succeeding parts of the eyeball where it is reflected from other interfaces, absorbed, dispersed, etc.

If the ultrasonic energy is transmitted in a sequence of distinct pulses, i.e., bursts of energy each time a pulse is transmitted a series of echo pulses will be returned. The time delays between the transmitted pulses and the returning echoes correspond to the flight times required for the energy to travel to the respective reflecting interface and return. Therefore, by measuring the time required for the echoes to return, the distances to the reflecting interface may be determined.

In order to transmit ultrasonic energy into the eyeball and to receive the returning echoes, the present system includes a search unit 28 which is adapted to be aligned with and acoustically coupled thereto. Although the search unit 28 may be of any desired variety, one search unit 28 that is especially useful for this type of instrument is disclosed and claimed in copending application and continued into Ser. No. 109,711 both of which are now abandoned, Ser. No. 685,054 filed Nov. 22, 1967 and assigned of record to Automation Industries, Inc. The search unit 28 includes a single ultrasonic transducer 30 that is capable of both transmitting and receiving. However, if desired two or more transducers may be used.

The transducer 30 may be of any conventional variety, such as a piezoelectric crystal. When a voltage is applied to the crystal it is physically distorted out of its normal shape and when the voltage is terminated the crystal returns to its true shape. These physical changes cause corresponding waves of ultrasonic energy to be radiated. The transmission normally occurs in a direction substantially perpendicular to the active surface of the crystal. If desired this surface of the crystal may be contoured to focus the energy into a relatively narrow, well defined, beam. Alternatively an ultrasonic lens may be aligned with the crystal to focus the energy.

The rate at which the crystal vibrates and the frequency of the transmitted ultrasonic energy are functions of the dimensions of the crystal, the frequency of the driving voltage, etc. Normally the frequency is in a range well above the response range of the human ear. By way of example, they may be in a range extending from about 25 kilocycles or lower to about 25 megacycles or higher.

The exact frequency used for any particular instrument may be empirically selected to provide the high degree of resolution and accuracy desired, etc. As a general guide line it has been found the higher the frequency the greater the resolution and accuracy. However, as the frequency increases the attenuation also increases. In several instruments it has been found a frequency in the area of about 20 megacycles provides adequate resolution and the attenuation is within an acceptable range.

Piezoelectric crystals are of a generally reciprocal nature. As a consequence, if ultrasonic energy is incident upon the active surface of the crystal and the crystal is physically distorted, a corresponding electrical signal will be produced. In other words each time an echo strikes the surface of the crystal an electrical pulse is generated. The wave shape of this electrical pulse is generally similar to the wave shape of the ultrasonic energy. Moreover, the time occurrance of the electrical pulse is substantially coincident with the reception of the echo. Accordingly by determining the shape of the electrical signal and its time occurrance considerable information can be obtained as to the nature of the reflecting interface and its position.

At the frequencies normally employed in an instrument of this type, even a very thin layer of air will virtually completely absorb all of the ultrasonic energy. Accordingly, if the transducer 30 is not placed in intimate direct contact with the outer surface of the workpiece it is customary to provide some form of a coupling medium between the active surface of the transducer and the entrant surface of the workpiece. The medium is highly transparent to ultrasonic energy. By way of example, a wide variety of liquids, such as water, are suitable.

The present search unit 28 includes a pair of goggles 32 or a similar device for being strapped onto the patient's head 34. The goggles 32 may include a separate lens 36 for each eye. The lens 36 is spaced from the eyeball 12 and is preferably normal to the optical axis thereof. Also, the lens 36 is preferably flat on both sides, of uniform thickness, transparent to ultrasonic energy and transparent to visible light. By way of example, the lens 36 may be ordinary glass.

The goggles 32 include a soft flap or lip 38 which is attached to the periphery of the lens 36 structure so as to completely surround the eye. This fits snuggly against the patient's skin so as to seal the space 42 between the lens 36 and the eyeball 12. This will permit the space being filled with a couplant, such as warm water.

In order to facilitate filling the space with couplant a hose may be attached to a fitting 40 which extends through the lip 38. This will permit putting the goggles 32 on without any couplant and then completely filling the space 42. It has been found desirable to employ a second fitting 44 to facilitate venting. Also, this will permit circulating the couplant through the sealed space 42 until all air bubbles etc. are swept out of the space 42. Moreover after the test has been completed the couplant may be drained from the space 42 before the goggles 32 are removed.

The transducer 30 is coupled to the lens 18 of the eyeball 12 which is to be inspected by the couplant. The axis of the transducer 30 is preferably disposed in substantial alignment with the optical axis of the eyeball 12. This will cause the ultrasonic energy to be propagated through the eyeball in the regions of primary interest.

It has been found the optical axis of an eyeball tends to wander especially if the eyegall is not maintained focused upon a fixed point. If the eye wanders a significant amount the ultrasonic energy does not always follow the same path and unpredictable variations may occur in the measurements. In order to prevent such misleading results it has been found desirable to stabilize the position of the eyeball being inspected. One simple way of accomplishing this is to provide a target for the eyeball 12 to focus on. For example, as disclosed in said copending application Ser. No. 685,054, the search unit may cause a bright spot or other optical target to appear in substantial alignment with the axis of the transducer 30. As long as the patient concentrates the vision of this eyeball 12 on this target his eye will remain fixed in a substantially constant position relative to the transducer 30.

Normally the target is effectively disposed at an infinite range and the eyeball 12 will be arranged in a configuration appropriate for focusing on distant objects. If it is desirable to measure the dimensions of the eyeball 12 when it is focused at a shorter distance or it is desirable to observe how the eyeball 12 changes as the focal distance changes, an object may be formed by an optical system whereby the apparent distance may be varied.

A transmitter or pulser 46 is provided for exciting the transducer 30 into transmitting the ultrasonic energy. The transmitter 46 includes a synchronizing input 48 and a signal output 50 coupled to the transducer 30 by means of a coaxial cable 52. Each time a synchronizing pulse is applied to the input 48 the transmitter produces a high voltage, high frequency, short duration electrical pulse suitable for driving the transducer 30.

The driving pulse is preferably effective to cause the ultrasonic pulse to be of extremely short duration. The shorter the pulse of ultrasonic energy the more accurate the measurements can be obtained. The frequency of the ultrasonic energy is preferably sufficiently high to insure a high degree of resolution. By way of example, the frequency may be in the range of 20 megacycles.

The synchronizing or control input 48 of the transmitter 46 is coupled to a source of clock signals or timing pulses. These are effective to control the repetition rate of the entire instrument 10. In the present instance a free running oscillator 54 provides a signal having several subharmonic frequencies, such as 1 and 2 megacycles. As explaind in more detail subsequently, these are used for reference markers.

In addition one or more frequency dividers 57 are provided to divide the frequency down to the frequency of the sync or timing pulses. Normally this frequency is on the order of about 2 kilocycles. This will cause the transmitter 46 to drive the transducer 30 into transmitting the ultrasonic pulses at a rate on the order of 2 kilocycles.

Each time the transmitter 46 supplies a driving pulse to the transducer 30, the transducer 30 radiates a short burst of ultrasonic energy which travels along the beam axis and into the eyeball 12. Each time the burst of ultrasonic energy traverses an interface between two portions of the eyeball 12, a fraction of the energy is reflected back along the beam axis toward the transducer 30. The transducer then generates and R.F. electrical signal having pulses corresponding to the echoes. Normally this signal includes an R.F. carrier having the same freuencies as the ultrasonic energy. The pulses are formed by the envelope on this carrier. Each of the pulses is delayed in time by an interval corresponding to the distance between the transducer and the reflecting interface.

When inspecting a typical eyeball 12 the signal from the transducer 30 resembles the signal of FIG. 3B and begins with a relatively large amplitude pulse 60. This corresponds to the "main bang," i.e., the driving pulse which excites the transducer. Following the initial pulse 60 there are a series of smaller pulses 61, 62, 63, 64, 65, 66 and 67, which are delayed therefrom by intervals that are functions of the distances to the front surface of the cornea 14, the interface between the cornea 14 and the anterior chamber 16, the interface between the anterior chamber 16 and the lens 18, the interface between the lens 18 and the vitreous body 20, the interface betwen the vitreous body 20 and the retina 22, the interface between the retina 22 and the choroid 24, the interface between the choroid 24 and the sclera 26.

In order to receive these signals a suitable receiver is coupled to the coaxial cable 52 shown in FIG. 1. This receiver 56 includes an amplifier 58 which increases the amplitude of the R.F. signals to a more useful level. The output from the amplifier 58 may be coupled to a fixed contact in a switch 70 whereby the switch 70 may be adjusted to select the R.F. signal.

The receiver 56 also includes a detector 72 which is coupled to the output of the amplifier 58. The detector 72 passes either the positive or negative portions of the envelope of the R.F. signal. The opposite portion and the R.F. carrier are suppressed whereby a video signal is provided. The output of the detector 72 is coupled to a second fixed contact in the switch 70 whereby a video signal may be selected. The moveable contact 74 in the switch 70 may be coupled to any suitable display means such as an oscilloscope 76. As will be explained in more detail subsequently, the switch 70 may be set to produce a display of either the R.F. signal or the video signal.

The output from the receiver 56 is coupled to a signal input 78 to a front surface gate 80. The details of this gate 80 are best seen in FIG. 2. The gate 80 includes a control or synchronizing input 82 which is coupled to the divider 57. The divider 57 provides a series of synchronizing pulses which are effective to open the gate 80. The synchronizing pluses are phase locked to the triggering pulses which activates the transmitter 46.

The control input 82 includes a pulse generator 84 which is effective to produce a squarewave signal. The sync signal from the divider 57 is coupled to the "set" input 86 of the generator 84 and is effective to set the generator 84, i.e., change to a second state whereby a squarewave pulse commences. The phase of the sync pulse and the inherent time delay of the pulse generator 84 are so arranged that the pulse produced by the generator 84 does not begin until after the effects of the driving pulse or "main bang" pulse 60 has dissipated from the receiver 56, etc. However, this delay should be shorter than the interval required to receive the first echo reflected from the eyeball 12.

A "reset" input 88 of the pulse generator 84 is coupled to the signal input 78 for the gate 80 so as to receive the video signal. Whenever a signal occurs on this input 88 the pulse generator 84 returns to its initial conditon and the pulse terminates until the next sync pulse occurs on the input 86.

Normally the first pulse 61 as shown in FIG. 3B in the video signal (after the "main bang") is the one corresponding to the reflection or echo from the front of the eyeball 12, i.e., the exterior of the cornea. The generator 84 includes a slight time delay whereby it does not reset nor its pulse terminate until a short interval after the completion of the first echo signal 61 on its reset input 88. However, the generator 84 resets prior to the second pulse 62. It will thus be seen the pulse from the generator 84 encompasses a short interval which includes the first echo from the front exterior of the eyeball.

The oscilloscope 75 is shown in this specification as a fourchannel oscilloscope of the type which is well known to those skilled in the art. Such an oscilloscope might be, for example, a model 1804A Hewlett Packard 180A type. The sweep generator 104 enables the Channels A, B, C and D in a sequential order in a manner well known. In the above type this is accomplished in a ring counter. When channel A 112 is enabled by the sweep generator, the signal from the RF amplifier 58 or the detector 72 is applied to the display through the appropriate channel. For example, when channel A 112 is enabled, the first sweep is shown at a first level on a display. When channel B 114 is enabled a second channel on a display on a separate line is displayed. Channel C 112 displays a signal on a separate line and subsequently channel D which is the marker signal is energized and displayed. To enable a display at a certain time period, a trigger signal from the pulse shaper amplifier 152 must enable the sweep generator to display the actual signal.

The front surface gate 80 includes a dual input AND gate 90. One of the inputs 92 is coupled to the pulse generator 84 whereby it receives the above described pulse. The second input 94 is coupled to the receiver 56 so as to receive the video signal. The output 96 from the AND gate 90 is coupled to a two stage pulse amplifier 98 including a pair of transistors 100 and 102. Normally the AND gate 90 is maintained closed and the transistor 100 biased non-conductive. As a result normally when the pulses 62 to 67 of the video signal occur no signals are coupled through the AND gate 90 nor the pulse amplifier 98 to the output 83.

However, each time a burst of ultrasonic energy is transmitted, the pulse generator 84 applies a squarewave gating pulse to the input 92 for an interval which includes the first video pulse 61. When this video pulse 61 occurs two things happen. First, the video pulse is coupled through the AND gate 90 to the now conductive transistor 100. As a result the second transistor 102 produces a pulse at the output 83. Secondly, the gating pulse at the input 92 terminates whereby the AND gate 90 closes and no further video pulses can pass through the AND gate 90 or the pulse amplifier 98.

It will thus be seen that each time a burst of ultrasonic energy is transmitted from the transducer 30 and into the eyeball 12, a pulse will be produced at the output 83 of the gate 80 substantially coincident with the echo 61 from the front surface of the eyeball, i.e., the exterior of the cornea 14.

The output 83 is coupled to a sweep generator 104 for the oscilloscope 76. This will insure the sweep being synchronized with the echo from the exterior of the cornea. If a single trace is employed the trace will include a separate vertical PIP for each of the interfaces. The distance between these interfaces may then be determined by measuring the distances between the PIPS.

In order to improve the accuracy of the present instrument and its ability to resolve the different interfaces within the eyeball 12 it has been found desirable to provide means for greatly expanding the trace and its scale. This is accomplished by, in effect, arbitrarily dividing the eyeball 12 into a plurality of different segments. Each of these segments includes one or more interfaces which are of particular interest. In the present instance there are three separate segments 106, 108 and 110. As best seen in FIG. 3A, the first segment 106 extends from the exterior surface of the cornea 14 to just beyond the front of the lens 18. As a result this segment 106 includes the interfaces on the opposite sides of the cornea 14, the opposite sides of the anterior chamber 16 and the front of the lens 18. The second segment 108 includes from just in front of the lens 18 to just beyond the lens 18. This segment 108 includes the front of the viterous body 20, the retina 22, the choroid 24 and the sclera 26. It should be noted these segments 106, 108 and 110 are imaginary. The position, size and number are controlled by the electronics in the instrument 10 and may be arbitrarily arranged as desired.

A separate channel 112, 114 and 116 is provided in the oscilloscope 76 for each of the segments 106, 108 and 110. In addition a separate channel 118 may be provided for a series of marker signals. All four of the channels are coupled to the vertical deflection means in the oscilloscope 76. The signal inputs of the first three channels 112, 114 and 116 are coupled to the moveable contact in the switch 70. The signal input to the fourth channel 118 is coupled to the moveable contact in the switch 119.

Each of the channels 112, 114, 116 and 118 includes a D.C. bias or similar signal, which is different from the other channels. This bias is added to the input signal whereby each channel will cause the electron beam to be biased to a distinctive elevation on the face of the oscilloscope 76. As a consequence the channels 112, 114 and 116 will display the signals for each segment 106, 108 and 110 at different vertical positions one above the other. In addition the fourth channel 118 will cause a series of reference markers to be displayed in vertical alignment with signals from the segments.

A separate gate 128, 130, 132 and 134 is provided for each of the channels. Each gate includes a signal input 120, 122, 124 and 126, a control input 136, 138, 140 and 142 and a signal output 144, 146, 148 and 150. The signal inputs 120, 122 and 124 are coupled to the front gate 80 and the signal input 126 is coupled to the divider 57. The control inputs 136, 138, 140 and 142 of the gates are coupled to the respective channels. Normally only one of the channels is operative and all of the others are inoperative. When a channel is operative it places a biasing signal on the control input of its respective gate whereby when the respective gate is open all of the other gates remain closed.

As best seen in FIG. 2 all of the gates 128, 130, 132 and 134 are substantially identical to each other. Each gate includes a transistor having a grounded emitter. The collectors are coupled directly to the outputs 144, 146, 148 and 150. The bases of the first three gates 128, 130 and 132 are are coupled to the output 83 of the front surface gate 80 by pairs of diodes. The fourth gate 134 is coupled to the divider 57 by a pair of diodes. All four bases are also separately coupled to the control inputs 136, 138, 140 and 142 which in turn are coupled to the outputs of their respective channels 112, 114, 116 and 118 in the oscilloscope 76 by separate diodes and resistors.

The outputs 144, 146, 148 and 150 of the gates 128, 130, 132 and 134 are all coupled to a pulse shaper and amplifier 152. Although the outputs 144 and 150 are coupled directly, the coupling for output 146 includes a first delay 154 and the coupling for output 148 includes a second delay 156.

When the first channel A is active a biasing voltage is applied to the input 136 whereby the gate 128 is open. As a result the pulse from the front surface gate 80 corresponding to the front of the cornea will be coupled from the front surface gate 80 through the first gate 128 to the pulse amplifier 152. Since all of the other channels are inactive all of the outer gates 130, 132, and 134 are biased closed and the front surface pulse will not reach the amplifier 152 by any other routes. The amplifier 152 includes a transistor having a grounded emitter and the collector coupled to the output 158 of the amplifier 152. As a consequence the front surface signal is amplified and shaped by the transistor and passed on to the sweep generator 104 to initiate the horizontal sweep on the oscilloscope.

It is to be noted when the first channel 112 is operative and the first gate 128 is open, the horizontal scan in the oscilloscope 76 is initiated substantially coincident with the first echo, i.e., the front or outer surface of the cornea 14. As the horizontal scan progresses across the face of the oscilloscope 76 any pulses in the R.F. or video signal (depending upon the setting of switch 70) corresponding to echoes will be coupled through the first channel 112 and cause a vertical deflection in the oscilloscope 76. The resultant trace 158 is shown at the top of FIG. 4.

The rate and length of the horizontal scan defines the length of the first segment 106 in the eyeball 12. In this embodiment this includes the cornea, anterior chamber and the front part of the lens. As a result this trace 158 will include vertical PIPS 161, 162, and 163 which are positioned to correspond to the interfaces. (It is to be noted the trace is drawn in a simplified and idealized form. In actual practice there may be one or more additional stray pulses.) The thickness of the cornea 14 corresponds to the space between the first and second PIPS 161 and 162. The thickness of the anterior chamber 16 corresponds to the space between the second and third PIPS 162 and 163.

At the completion of the first scan the first channel 112 becomes inoperative. This causes the associated gate 128 to CLOSE and the second channel 114 to become operative. At the same time its associated gate 130 OPENS. During these conditions when the pulse from the front surface gate 80 occurs, a timing pulse is coupled through the second gate 130 to the delay 154 and then to the amplifier 152 so as to initiate a second scan. However, because of delay 154 the scan will not start with the first echo from the front of the cornea.

The time duration from the delay 154 may be arbitrarily selected. It is normally equal to the time required for the ultrasonic energy to travel from the front surface of the cornea 14, i.e., the beginning of the first segment 106 to the beginning of the second segment 108 and return to the front of the cornea 14. Normally the second segment 108 is selected to start just before the front of the lens 18 and to extend just beyond the lens 18 into the vitreous body 20. The second trace 168 includes a first PIP 163 corresponding to the front of the lens 18 and a second PIP 164 corresponding to the rear of the lens 18. The space between these two PIPS 163 and 164 correspond to the thickness of the lens 18. It is to be noted the sweep for the first and second traces 158 and 168 are produced by the same sweep generator 104 whereby the two traces have the same scale. However, because of the delay the two traces 158 and 168 correspond to two different segments 106 and 108 of the eyeball 12.

At the completion of the second scan the second channel 114 becomes inoperative and its associated gate 130 CLOSES. The third channel 116 then becomes operative and its gate 132 OPENS. The cornea pulse from the front surface gate 80 is coupled to the amplifier 152 by the second delay 156. If the pulse is weakened because of delay, etc. an additional stage 174 may be provided to increase its amplitude.

It can be seen the third trace 176 is initiated by the front surface echo but is delayed by a time interval equal to that from the second delay 156 which is made equal to the time required for the ultrasonic energy to travel from the front of the cornea 14 to the beginning of the third segment 110 and return to the front of the cornea 14. Normally this segment 110 is selected to start near the rear of the vitreous body 20 and extend beyond the rear of the eyeball 12.

The PIPS 165, 166, 167 and 168 in this trace 176 correspond to the interfaces between the rear of the vitreous body 20 and the retina 22, the retina 22 and choroid 24, the choroid 24 and sclera 26. Accordingly, the dimensions of the retina, choroid and sclera can be determined by measuring the spacing between these PIPS.

The fourth trace 186 is provided to facilitate measuring the positions of the various PIPS by providing a series of reference markers. This trace 186 is produced by the fourth channel 118. This channel 118 and its associated gate 134 OPEN after the third scan is completed and the third channel 116 has become inoperative. When the fourth pulse of ultrasonic energy is transmitted the first three channels 112, 114 and 116 are all inoperative and the gates 128, 130 and 132 are CLOSED. As a result none of the echo signals will be displayed on the face of the oscilloscope 76 and the sweep will not be initiated in response to the first echo pulse.

However, the sync signal from the divider 57 will be coupled through the gate 134 to the amplifier 152 whereby the fourth scan will be initiated in synchronism with the ultrasonic transmission. During this scan the signals from the switch 119 will be coupled through the fourth channel to the oscilloscope 76. This causes a series of reference markers 188 to be produced in the fourth trace 186. Since the scan rates in all four of the traces 158, 168, 176 and 186 are identical, the distances on the four traces represent the corresponding distances in the different segments. By a proper selection of the frequencies supplied to the switch 119, the resultant markers may be used to accurately indicate the dimensions between the PIPS. Following the fourth scan the first channel is again activated whereby the foregoing process repeats itself.

SUMMARY OF OPERATION

In order to use the present instrument 10 for measuring the dimensions of an eyeball 12 the goggles 32 are placed on the patient's head. The transducer 30 is coupled to the lens 36 and the coupling fluid circulated through the hoses to fill the space between the lens 36 and the eyeball 12. The sync pulses from the divider 57 energizes the pulser or transmitter 46 at a repetition rate of about 2 kilocycles. The driving pulses travel over the coaxial cable 52 and excite the transducer 30 into transmitting pulses or bursts of ultrasonic energy into the eyeball 12. If the patient maintains his eye focused on the bright spot in the search unit 28 the eyeball 12 will remain substantially fixed and the ultrasonic beam will be maintained aligned with the optical axis of the eyeball 12.

As the ultrasonic energy traverses the interfaces, the resultant echoes are reflected back toward the front of the eyeball and are received by the transducer 30. The transducer generates an electrical R.F. signal corresponding to these echoes and resembling the signal of FIG. 3B.

The signal begins with a large amplitude pulse 60 corresponding to the "main bang" or the transmission of the ultrasonic energy. This is followed by a series of lower amplitude pulses 61 to 67 corresponding to the echoes from the successive interfaces. Each of these pulses is delayed by the flight time required for the ultrasonic energy to travel to the reflecting interface and return to the transducer.

The R.F. signal generated by the transducer 30 is returned by the coaxial cable 52 to the receiver 56. The R.F. signal is amplified in the first section 58 of the receiver and coupled to the fixed contact in the switch 70. It is also detected in the second section 72 whereby the R.F. carrier and one side of the envelope are removed. The resultant video signal is then coupled to the second fixed contact in the switch 70. Depending upon the setting of the moveable contact, either the R.F. or video signal is coupled to the first three channels 112, 114 or 116 in the oscilloscope 76. At the same time the video signal is coupled to the front surface gate 80.

Assume initially the first channel 112 is operative. Since the entire sequence of operations repeats itself endlessly it is immaterial which channel is operative initially. Moreover, at some point in the sequence the first channel 112 does become operative. Under these circumstances the first gate 128 is OPEN and the second, third and fourth channels 114, 116 and 118 are inoperative and their associated gates 130, 132 and 134 CLOSED. The first channel 112 adds a DC bias whereby the electron beam is maintained aligned with the level of the first trace 158. The video signal (or the R.F. signal if the switch 70 is so set) is coupled through the first channel 112 to the vertical deflection means whereby the beam is raised or lowered relative to the level of the trace in accordance with the video signal.

The video signal is also coupled from the receiver 56 to the front surface gate 80. The pulse generator 84 and AND gate 90 are effective to pass just the first echo from the outer surface of the cornea 14. This pulse is passed through the amplifier 152 so as to trigger the sweep generator 104 whereby the first trace 158 and segment 106 begin substantially coincident with the exterior of the cornea. The first trace will thereby produce a display having PIPS 161, 162, and 163 positioned to correspond to the interfaces in the first segment 106.

At the completion of the first scan the second channel 114 becomes operative and the second gate 130 is OPEN. The pulse from the front surface gate 80 is now coupled through the delay 154 to the amplifier 152. This triggers the sweep generator 104 whereby the electron beam is scanned across the face of the oscilloscope at the level of the second trace 168. The beginning of this scan is delayed to correspond to the beginning of the second segment 108 whereby the vertical PIPS 163 and 164 correspond to the positions of the interfaces in this segment 108.

At the completion of the third scan the third channel 116 becomes operative and gate 132 OPENS. The video signal now passed through this channel 116 whereby the third trace 176 is formed. Since the front surface pulses from the gate 80 now pass through the delay 156, the horizontal scan is delayed to correspond to the beginning of the third segment. During this scan the electron beam will be deflected vertically in response to the echoes to from PIPS 165 to 168 corresponding to the interfaces in this segment 110 of the eyeball.

It is, of course, readily apparent that the distance between two interfaces contained within the same segment may be determined by measuring the distances between the corresponding vertical PIPS in the associated trace. For example, the thickness of the lens 18 may be determined by measuring the distance between the PIPS 163 and 164 in the second trace 168. Similarly the thickness of the anterior chamber 16 may be determined by measuring the distance between the PIPS 162 and 163. Since the traces correspond to small segments within the eyeball 12 the accuracy is greatly enhanced due to the large magnification of the scale.

In order to improve the accuracy of the measurements the fourth channel 118 becomes operative after the first three channels and displays reference markers 188. The spacing between the reference markers correspond to particular distances within the eyeball 12. For example, they may represent a certain number of millimeters, thousandth of an inch, etc. as determined by the setting of the switch.

It is also possible to accurately measure the position of any interface relative to the front of the cornea or the dimensions of a part, such as the length of the vitreous body, even though it spans several segments and different traces.

The PIP 164 in the second trace 168 represents the front of the vitreous body 20 while the PIP 165 in the third trace 176 represents the rear. This dimension is obtained by determining the distance from the PIP 164 to the end of the second trace 168. The distance from the beginning of the third trace 176 to the PIP 165 is then measured. These two distances are then added together.

It is then necessary to add to the foregoing sum a distance corresponding to the distance between the second and third segments 108 and 110. This dimension is determined by the time duration of the second delay 156 and is equal to the round trip distance ultrasonic energy will travel during this inverval.

If it is desirable to correlate the dimensions with respect to the front of the cornea 14 the positions of the PIPS on the different traces are measured and distances corresponding to differences between the different segments are added or subtracted.

Normally it is desirable for this instrument 10 to be used on a wide variety of eyeballs of different size and shapes. To facilitate such useage it is desirable to be able to vary the positions of the segments within the eyeball. To accomplish this objective the two delays 154 and 156 may be made of a variable nature, i.e. the durations of the delays are variable. Preferably each delay 154 and 156 is adjustable by a step type switch which is calibrated and its settings marked in terms of the distances within the eyeball. The operator may adjust or manipulate a switch so as to move the segment until the corresponding trace contains the PIPS associated with the interfaces which are of interest. Since the switches are calibrated in terms of the units of length the operator can easily make the computations described above.

While only a single embodiment of the present invention has been disclosed herein, it will be readily apparent to persons skilled in the art that numerous changes and modifications may be made thereto. Accordingly, the foregoing drawings and description thereof are for illustrative purposes only and do not in any way limit the scope of the invention which is defined only by the claims which follow.

We claim:

1. An ultrasonic inspection instrument for inspecting an eyeball, said instrument including the combination of an ultrasonic search unit for transmitting ultrasonic energy into said eyeball and receiving echoes of energy reflected from the interfaces in said eyeball,
receiving means coupled to the search unit and effective to produce signals corresponding to the echoes received by the search unit,
a cathode ray oscilloscope,
sweep generator means coupled to the cathode ray oscilloscope for scanning the electron beam across the face of the oscilloscope to produce a visible trace,
first and second channels coupled to said receiving means for sequentially coupling the receiving means to the oscilloscope whereby the oscilloscope produces separate traces for each channel,
trigger means coupled to the receiving means and responsive to the signal corresponding to the first echo from the eyeball, and
means coupling said trigger means to the sweep generator whereby the sweep generator is triggered in response to the signal corresponding to the first echo, said coupling means including at least one time delay means for one of said channels whereby the sweep for that channel is delayed for a predetermined interval after the first echo whereby the first and second traces correspond to different portions within the eyeball.

2. An ultrasonic inspection instrument for inspecting an eyeball, said instrument including the combination of an ultrasonic search unit for transmitting ultrasonic energy into said eyeball and receiving echoes of energy reflected from the interfaces in said eyeball,
receiving means coupled to the search unit and effective to produce signals corresponding to the echoes received by the search unit,
a cathode ray oscilloscope,
sweep generator means coupled to the cathode ray oscilloscope for scanning the electron beam horizontally across the face of the oscilloscope to produce a horizontal visible trace,
first and second channels coupled to said receiving means for sequentially coupling the receiving means to the oscilloscope whereby the oscilloscope produces separate traces for each channel,
vertical deflection means in at least one of said channels for displacing one of said traces vertically from the other trace,
trigger means coupled to the receiving means and responsive to the signal corresponding to the first echo from the eyeball,
means coupling said trigger means to the sweep generator whereby the sweep generator is triggered in response to the first echo, said coupling means including at least one time delay means for one of said channels whereby the sweep for that channel is delayed for a predetermined interval after the first echo whereby the first and second traces correspond to a different portion within the eyeball.

3. An ultrasonic inspection instrument for inspecting an eyeball which is divided into a plurality of imaginary segments, said instrument including the combination of an ultrasonic search unit for transmitting ultrasonic energy into said eyeball and receiving echoes of energy reflected from the interfaces in said eyeball,
receiving means coupled to the search unit and effective to produce a signal corresponding to the echoes received by the search unit,
a cathode ray oscilloscope, sweep generator means coupled to the cathode ray oscilloscope for scanning the electron beam horizontally across the face of the oscilloscope to produce a visible trace, a channel for each of said segments in the eyeball, each of said channels being coupled to the oscilloscope whereby the oscilloscope produces separate traces for each channel corresponding to the respective segment in said eyeball, trigger means coupled to the receiving means and responsive to the portion of the signal corresponding to the first echo from the eyeball, means coupling said trigger means to the sweep generator, and time delay means in said coupling means whereby the horizontal scan for each channel is delayed for a predetermined interval which is a function of the position of the corresponding segment in the eyeball.

4. An ultrasonic inspection instrument for inspecting an eyeball, said instrument including the combination of means for transmitting ultrasonic energy into said eyeball and producing a signal corresponding to the echoes of said energy reflected from inside said eyeball, a cathode ray oscilloscope, horizontal and vertical deflection means in the cathode ray oscilloscope for scanning the electron beam in said oscilloscope across the face of the oscilloscope whereby a visible trace is produced, sweep means coupled to said first means and responsive to the signal therefrom, said sweep means being coupled to the horizontal deflection means and effective to sweep said electron beam horizontally across the face of the oscilloscope, time delay means coupled to the sweep means whereby the preselected horizontal sweeps of said electron beam are delayed for predetermined intervals, and means coupling said first means to the vertical deflection means for deflecting the electron beam vertically in response to said signal as it is swept horizontally, said last means being effective to deflect the electron beam vertically a predetermined distance when the sweep is delayed to thereby provide a pair of vertically displaced traces representing different portions of said signal from said first means and corresponding to different portions of said eyeball.

5. An ultrasonic inspection instrument for inspecting an eyeball which is subdivided into a plurality of imaginary segments, said instrument including the combination of an ultrasonic search unit for transmitting and receiving ultrasonic energy, means for acoustically coupling the search unit to said eyeball whereby said search unit transmits ultrasonic energy into said eyeball and receives echoes of said ultrasonic energy reflected from the interfaces within said eyeball, transmitting means coupled to said search means and effective to cause said search unit to transmit pulses of said ultrasonic energy into said eyeball, receiving means coupled to said search unit and responsive to the signals produced by said search unit in response to the echoes, and indicating means coupled to the receiving means and responsive to the signals therefrom, said indicating means being effective to produce separate indications for each segment and to separately indicate the distances to said interfaces in each of said segments, said indicating means including a cathode ray oscilloscope which is effective to produce separate visible traces for said segments corresponding to the signals, and means in said cathode ray oscilloscope for vertically displacing said traces from each other whereby there is a separate trace for each of said segments.

6. An ultrasonic inspection instrument for inspecting an eyeball which is subdivided into a plurality of imaginary segments, said instrument including the combination of an ultrasonic search unit for transmitting and receiving ultrasonic energy, means for acoustically coupling the search unit to said eyeball whereby said search unit transmits ultrasonic energy into said eyeball and receives echoes of said ultrasonic energy reflected from the interfaces within said eyeball, transmitting means coupled to said search means and effective to cause said search unit to transmit pulses of said ultrasonic energy into said eyeball, receiving means coupled to said search unit and responsive to the signals produced by said search unit in response to the echoes, indicating means coupled to the receiving means and responsive to the signals therefrom, said indicating means being effective to produce separate indications for each segment and to separately indicate the distances to said interfaces in each of said segments, and said indicating means including a cathode ray oscilloscope, a sweep generator coupled to said cathode ray oscilloscope for causing the electron beam thereof to sweep across the oscilloscope and produce a visible trace, and means coupled to the receiving means and the sweep generator for energizing said sweep generator in response to the portions of said signals corresponding to said segments.

7. An ultrasonic inspection instrument for inspecting an eyeball which is subdivided into a plurality of imaginary segments, said instrument including the combination of an ultrasonic search unit for transmitting and receiving ultrasonic energy, means for acoustically coupling the search unit to said eyeball whereby said search unit transmits ultrasonic energy into said eyeball and receives echoes of said ultrasonic energy reflected from the interfaces within said eyeball, transmitting means coupled to said search means and effective to cause said search unit to transmit pulses of said ultrasonic energy into said eyeball, receiving means coupled to said search unit and responsive to the signals produced by said search unit in response to the echoes, indicating means coupled to the receiving means and responsive to the signals therefrom, said indicating means being effective to produce separate indications for each segment and to separately indicate the distances to said interfaces in each of said segments, and said indicating means including a cathode ray oscilloscope having a display, a sweep generator coupled to the display in the cathode ray oscilloscope and effective to produce a horizontal scan of the electron beam in the cathode ray oscilloscope, a separate channel for each of said segments effective to sequentially couple the cathode ray oscilloscope to the receiving means whereby the cathode ray oscilloscope produces a separate trace for each of said segments, and means for displacing said traces at different positions on the face of the oscilloscope for indicating different segments within the eyeball.

8. An ultrasonic inspection instrument for inspecting an eyeball, said instrument including
   an ultrasonic means for transmitting ultrasonic energy into said eyeball and receiving echoes reflected from said eyeball,
   a cathode ray oscilloscope,
   a sweep generator for scanning the electron beam across the oscilloscope,
   trigger means coupled to the sweep generator and said ultrasonic means, said trigger means being responsive to the first echo from said eyeball and effective to cause the sweep generator to sweep the electron beam across the face of the cathode ray oscilloscope to produce a trace,
   a plurality of channels coupled to the ultrasonic means and said cathode ray oscilloscope,
   means for causing only one of said channels to be operative at a time, the operative channel being effective to produce a trace at its respective level whereby separate traces are provided for each of the channels, and
   time delay means for at least one of said channels coupled to the trigger means and effective to delay the sweep when that respective channel is operative whereby the trace for that channel corresponds to a different segment of the eyeball.

9. The ultrasonic inspection instrument of claim 8 including
   reference means for producing a sequence of reference signals corresponding to predetermined distances in the eyeball, and
   an additional channel effective to produce an additional trace containing reference markers corresponding to said signals whereby the dimension on said trace may be determined from the last trace.

* * * * *